US010675655B2

(12) United States Patent
Zhuang et al.

(10) Patent No.: US 10,675,655 B2
(45) Date of Patent: *Jun. 9, 2020

(54) DEVICE AND METHOD FOR POWDER DISTRIBUTION AND ADDITIVE MANUFACTURING METHOD USING THE SAME

(71) Applicant: INDUSTRIAL TECHNOLOGY RESEARCH INSTITUTE, Hsinchu (TW)

(72) Inventors: Chuan-Sheng Zhuang, Taichung (TW); Ching-Chih Lin, Kaohsiung (TW); Steven Lin, Tainan (TW); Wei-Lun Tai, Taichung (TW); Wen-Peng Tseng, Tainan (TW); Ji-Bin Horng, Tainan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 311 days.

This patent is subject to a terminal disclaimer.

(21) Appl. No.: 15/294,051

(22) Filed: Oct. 14, 2016

(65) Prior Publication Data

US 2017/0036238 A1 Feb. 9, 2017

Related U.S. Application Data

(62) Division of application No. 13/460,259, filed on Apr. 30, 2012, now Pat. No. 9,533,350.

(30) Foreign Application Priority Data

Jan. 20, 2012 (TW) .............................. 101102390 A

(51) Int. Cl.
*B05C 19/00* (2006.01)
*B33Y 30/00* (2015.01)
(Continued)

(52) U.S. Cl.
CPC ........ *B05C 19/005* (2013.01); *B01F 11/0002* (2013.01); *B05C 19/008* (2013.01);
(Continued)

(58) Field of Classification Search
CPC ... B29C 64/153; B29C 64/205; B29C 64/307; B29C 31/00; B29C 31/02; B29C 31/04;
(Continued)

(56) References Cited

U.S. PATENT DOCUMENTS

| 912,281 A | 2/1909 | Brunner et al. |
| 4,722,430 A * | 2/1988 | Canziani .............. B65G 47/962 198/370.04 |

(Continued)

FOREIGN PATENT DOCUMENTS

| CN | 1283578 A | 2/2001 |
| CN | 101310964 A | 11/2008 |

(Continued)

OTHER PUBLICATIONS

Simchi et al., "On the development of direct metal laser sintering for rapid tooling", Journal of Materials Processing Technology, vol. 141, pp. 319-328, 2003.

(Continued)

*Primary Examiner* — Andrew D Stclair
(74) *Attorney, Agent, or Firm* — Rabin & Berdo, P.C.

(57) ABSTRACT

The present disclosure provides a device and method for powder distribution and an additive manufacturing method, wherein different size or kind of powders could be chosen to be accommodated within a receptacle. The receptacle can uniformly mix the powder by a rotation movement, pour out the powders by the rotation movement and distribute the powders for forming a layer by a translation movement. In another embodiment, the receptacle further comprises a heating element for preheating the powders. Not only can (Continued)

the present disclosure uniformly mix the powders so as to reduce the thermal deformation and distribute the powder layer compactly, but also can the present disclosure distribute different kinds of powder in different layer so as to increase the diversity in additive manufacturing.

8 Claims, 20 Drawing Sheets

(51) Int. Cl.
| | |
|---|---|
| *B22F 3/105* | (2006.01) |
| *B29C 64/20* | (2017.01) |
| *B29C 64/153* | (2017.01) |
| *B01F 11/00* | (2006.01) |
| *B22F 1/00* | (2006.01) |
| *B33Y 40/00* | (2020.01) |
| *B23K 26/342* | (2014.01) |
| *B23K 26/70* | (2014.01) |
| *B05C 19/06* | (2006.01) |

(52) U.S. Cl.
CPC ............ *B05C 19/06* (2013.01); *B22F 1/0003* (2013.01); *B22F 3/1055* (2013.01); *B23K 26/342* (2015.10); *B23K 26/702* (2015.10); *B29C 64/153* (2017.08); *B29C 64/20* (2017.08); *B33Y 30/00* (2014.12); *B33Y 40/00* (2014.12); *B22F 2003/1056* (2013.01); *Y02P 10/295* (2015.11)

(58) Field of Classification Search
CPC ........... B29C 31/06; B29C 31/10; B05D 1/12; B05C 19/005; B32B 23/00; B32B 19/00; B32B 25/00
See application file for complete search history.

(56) References Cited

U.S. PATENT DOCUMENTS

| | | | |
|---|---|---|---|
| 5,038,910 A | | 8/1991 | Lassiter, Jr. et al. |
| 5,252,264 A | | 10/1993 | Forderhase et al. |
| 5,310,039 A | | 5/1994 | Butera et al. |
| 5,387,380 A | * | 2/1995 | Cima ...................... B05C 19/04 264/109 |
| 5,443,358 A | | 8/1995 | Yanniello |
| 5,597,589 A | | 1/1997 | Deckard |
| 5,647,931 A | * | 7/1997 | Retallick ................. B22F 3/004 156/273.3 |
| 5,658,412 A | | 8/1997 | Retallick et al. |
| 5,730,925 A | | 3/1998 | Mattes et al. |
| 5,890,629 A | | 4/1999 | Loew |
| 5,934,343 A | | 8/1999 | Gaylo et al. |
| 5,938,080 A | * | 8/1999 | Haaser ................ B01F 13/1058 141/104 |
| 6,136,257 A | | 10/2000 | Graf et al. |
| 6,336,480 B2 | | 1/2002 | Gaylo et al. |
| 6,376,148 B1 | | 4/2002 | Liu et al. |
| 6,823,230 B1 | | 11/2004 | Jamalabad et al. |
| 7,047,098 B2 | | 5/2006 | Lindemann et al. |
| 7,048,530 B2 | | 5/2006 | Gaillard et al. |
| 7,807,947 B2 | | 10/2010 | Partanen et al. |
| 2001/0015238 A1 | | 8/2001 | Gaylo et al. |
| 2001/0050448 A1 | * | 12/2001 | Kubo .................... B33Y 30/00 264/308 |
| 2002/0105114 A1 | | 8/2002 | Kubo et al. |
| 2002/0152002 A1 | | 10/2002 | Lindemann et al. |
| 2002/0195747 A1 | * | 12/2002 | Hull ...................... B29C 41/12 264/401 |
| 2004/0170765 A1 | * | 9/2004 | Ederer ................. B05C 11/023 427/355 |
| 2004/0223824 A1 | * | 11/2004 | Kuo ...................... B23Q 1/601 409/235 |
| 2006/0105102 A1 | | 5/2006 | Hochsmann et al. |
| 2006/0219671 A1 | | 10/2006 | Merot et al. |
| 2008/0256788 A1 | | 10/2008 | Glazebrook |
| 2009/0035411 A1 | | 2/2009 | Seibert et al. |
| 2010/0011775 A1 | | 1/2010 | Garry et al. |
| 2011/0109016 A1 | * | 5/2011 | Fuwa .................... B22F 3/1055 264/460 |
| 2011/0223349 A1 | | 9/2011 | Scott |
| 2011/0241947 A1 | | 10/2011 | Scott et al. |
| 2011/0287185 A1 | * | 11/2011 | Felstead ................ B22F 3/105 427/277 |

FOREIGN PATENT DOCUMENTS

| | | |
|---|---|---|
| CN | 101422963 A | 5/2009 |
| GB | 2258176 A | 2/1993 |
| TW | 235350 | 12/1994 |
| TW | 396076 B | 7/2000 |
| TW | 577815 B | 3/2004 |
| TW | I239874 B | 9/2005 |
| TW | I242606 B | 11/2005 |
| TW | I266687 B | 11/2006 |
| TW | I276484 B | 3/2007 |
| TW | 200938042 A | 9/2009 |
| WO | WO-2011139147 A1 | 11/2011 |

OTHER PUBLICATIONS

Kruth et al., "New Ferro Powder for Selective Laser Sintering of Dense Parts", CIRP Annals—Manufacturing Technology, vol. 52, Iss. 1, pp. 139-142, 2003.

Bertrand et al., "Ceramic components manufacturing by selective laser sintering", Applied Surface Science, vol. 254, pp. 989-992, 2007.

Bai et al., "Analysis and Research relating to movement parameters of the roller for powder levelling in solid powder selective laser sintering", Nanjing University of Aeronautics and Astronautics, pp. 15-17, 1997.

Hagedorn et al., "Net Shaped High Performance Oxide Ceramic Parts by Selective" Laser Melting, Physics Procedia vol. 5. pp. 587-594, 2010.

Taiwan Patent Office, Office Action, Patent Application Serial No. TW101102390, dated Mar. 20, 2014, Taiwan.

* cited by examiner

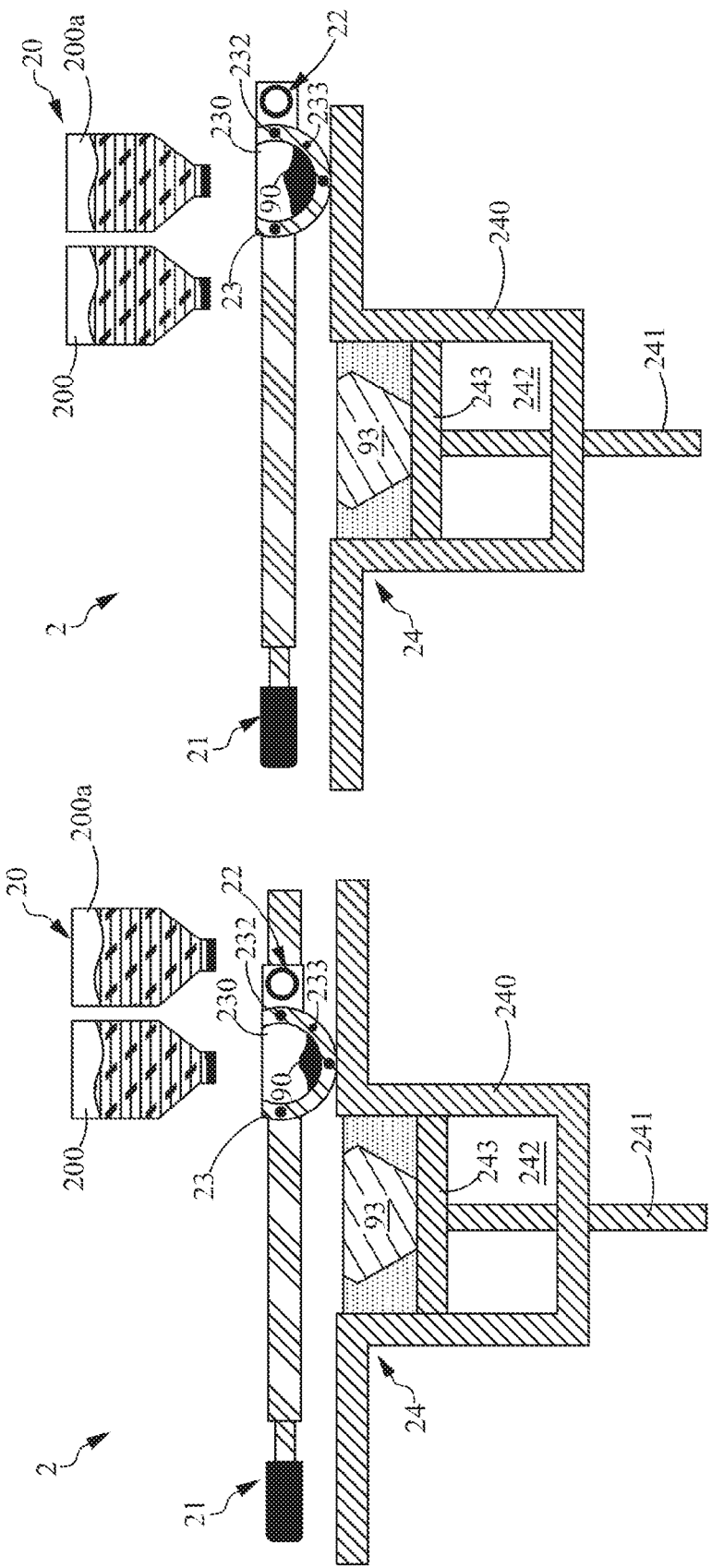

DEVICE AND METHOD FOR POWDER DISTRIBUTION AND ADDITIVE MANUFACTURING METHOD USING THE SAME

CROSS-REFERENCE TO RELATED APPLICATION

This application is a divisional of co-pending application Ser. No. 13/460,259, filed Apr. 30, 2012, the entire disclosure of which is incorporated herein by reference.

FIELD

The present disclosure relates to a device and method for powder handling, and more particularly, to a device and method for powder distribution and an additive manufacturing method using the same.

BACKGROUND

The term additive manufacturing describes technologies which can be used anywhere throughout the product life cycle from pre-production (i.e. rapid prototyping) to full scale production (also known as rapid manufacturing) and even for tooling applications or post production customization. Accordingly, Additive manufacturing (AM) is defined as the process of joining materials to make objects from 3D model data, usually layer upon layer, as opposed to subtractive manufacturing methodologies, such as traditional machining. The first successful attempts at additive manufacturing came from technology developed in the 1970s, and since then the additive manufacturing technology is developing rapidly with increasing industrial applications. Nowadays, there are already a variety of AM techniques being developed, such as three-dimensional printing (3DP), stereo lithography apparatus (SLA), laminated object manufacturing (LOM), selective laser sintering (SLS), selective laser melting (SLM), and fused deposition modeling (FDM), etc.

Currently, the most well-known additive manufacturing technique is the laser-based additive manufacturing (LBAM) technique, such as the selective laser sintering (SLS) and the selective laser melting (SLM). Taking a SLM process for example, it is performed using a high power laser to fuse small particles of plastic, metal, ceramic, or glass powders into a mass that has a desired 3-dimensional shape. The laser selectively fuses powdered material by scanning cross-sections generated from a 3-D digital description of the part on the surface of a powder bed. After each cross-section is scanned, the powder bed is lowered by one layer thickness, a new layer of material is applied on top, and the process is repeated until the part is completed. It is noted that LBAM can produce relatively complex three-dimensional structures like inner cavities and inner channels, which are normally difficult or impossible for traditional manufacturing technologies based on material removal. However, there are still issues to be solved for improving the current additive manufacturing technique, such as how to increase the density of the part being built, how to increase the uniformity of deposition, how to get improvement in the geometrical accuracy of the part being built, and how to eliminate the thermal deformation due to the temperature variation in the ambience, and so on.

There are already many studies focused upon the improvement of additive manufacturing technique. One of which is an apparatus for producing parts by selective sintering, disclosed in U.S. Pat. No. 5,594,589, in which a powder dispensing mechanism including a drum is used and enabled to move horizontally across the target area and counter-rotated to smooth and distribute the powder in an even layer across the target area, while also a downdraft system is used for providing a controlled temperature air flow through the target area to moderate powder temperature during sintering. Moreover, there is a coating device provided in U.S. Pat. No. 5,730,925, which is configured with a bevel scraper or a round scraper to be used for applying, smoothing and compacting the solidified material on a layer. Similarly, there is an applicator unit disclosed in U.S. Pat. No. 7,047,098, in which a flexible means is used for applying a powder layer to a layer below it. In addition, in U.S. Pat. No. 7,048,530, a shoe with a working surface having specific indentations formed thereon to be used for applying a powder layer is disclosed, which is arranged and adapted to rotate and incline at an angle so as to spread and thus apply the powder layer.

TECHNICAL SUMMARY

The present disclosure relates to a powder distribution method and device, in which powders are received in a receptacle for enabling the same to be poured out of the receptacle and piled up on a specific position by a rotation movement of the receptacle so as to be prepared to be distributed into a layer on a working area by a linear translation movement of the receptacle.

The present disclosure further relates to a powder distribution method and device, in which powders of different kinds and different particle sizes are received in a receptacle for enabling the same to be mixed uniformly by a rotation movement of the receptacle, and then to be poured out and piled up on a specific position by the rotation movement of the receptacle, so as to be prepared to be distributed into a layer on a working area by a linear translation movement of the receptacle. Consequently, by enabling the powders to be fully and uniformly mixed by the rotation movement of the receptacle, the compactness of the layer formed by the distributed powder can be improved.

The present disclosure further relates to a powder distribution method and device, in which either one kind of powder of the same particle size or powders of different kinds and different particle sizes are received in a receptacle that is configured with a heating element in a manner that the powders in the receptacle can be preheated uniformly by the heating element while being mixed uniformly by a rotation movement of the receptacle, and then to be poured out and piled up on a specific position by the rotation movement of the receptacle, so as to be prepared to be distributed into a layer on a working area by a linear translation movement of the receptacle for preparing the layer of powders to be processed by beams emitted from a light source. It is noted that after each processing of one layer of powders is completed, a new layer of powders different from the previous layer in types or particle size is applied on top, and then the process is repeated until a part formed from successive layers of different materials is completed.

In an exemplary embodiment, the present disclosure provides a powder distribution device, which comprises: a feeder, a translation driver, a rotation driver and a receptacle. The feeder is used for providing at least one powder. The translation driver is used for providing a translational driving force. The rotation driver is used for providing a rotational driving force while being coupled to the translation driver so as to receive the translational driving force for driving the rotation driver to perform a linear translation movement. The receptacle is coupled to the rotation driver for receiving the rotational driving force so as to be driven to perform a rotation movement while being brought along to move with the rotation driver in the linear translation movement. Moreover, the receptacle is provided for receiving at least one powder therein for allowing the at least one powder to be poured out and piled on a specific position by the rotation movement so as to be prepared to be distributed into a layer by the linear translation movement of the receptacle.

In another exemplary embodiment, the present disclosure provides a powder distribution method, which comprises the steps of: using a translation driver for driving a receptacle to move to a first position; enabling a feeder to provide at least one kind of powder to the receptacle at the first position; using the translation driver for driving the receptacle to move to a second position; using a rotation driver for driving the receptacle to rotate and thus enabling the powder received in the receptacle to be poured out from the same and deposited on the second position; and enabling the receptacle to be driven to move by the translation driver for moving the receptacle across the second position and thus distributing the powder deposited thereat into a layer on a working area.

In another exemplary embodiment, the present disclosure further provides a powder distribution method, which comprises the steps of: using a translation driver for driving a receptacle to move to a first position; enabling a feeder to provide at least one kind of powder to the receptacle at the first position; using the translation driver for driving the receptacle to move to a second position; using a rotation driver for driving the receptacle to rotate and thus enabling the powder received in the receptacle to be poured out from the same and deposited on the second position; enabling the receptacle to be driven to move by the translation driver for moving the receptacle across the second position and thus distributing the powder deposited thereat into a layer on a working area; using the projection of a processing light that is produced from a light source to perform an optical fabrication process upon the layer of powder distributed on the working area; and repeating the forgoing steps until a part formed from successive layers of the same material is completed.

In another exemplary embodiment, in addition to and after each projection of the processing light is completed, the powder distribution method further comprises the steps of: changing the kind of powder to be received in the receptacle at the first position by enabling the feeder to provide at least one other kind of powder that is different from the previous powder to the receptacle at the first position; using the translation driver for driving the receptacle to move to the second position; using the rotation driver for driving the receptacle to rotate and thus enable the powder received in the receptacle to be poured out from the same and deposited on the second position; enabling the receptacle to be driven to move by the translation driver for moving the receptacle across the second position and thus distributing the powder deposited thereat into a new layer on top of the exiting layers of the working area after the working area is being lowered by one layer thickness; using the projection of the processing light to perform an optical fabrication process upon the layer of powder distributed on the working area; and repeating the forgoing steps until a part formed from successive layers of different materials is completed.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein:

FIG. 8A to FIG. 8J are schematic diagrams showing respectively steps performed in a powder distribution method according to an exemplary embodiment of the present disclosure.

DESCRIPTION OF THE EXEMPLARY EMBODIMENTS

For your esteemed members of reviewing committee to further understand and recognize the fulfilled functions and structural characteristics of the disclosure, several exemplary embodiments cooperating with detailed description are presented as the follows.

Figure 1:
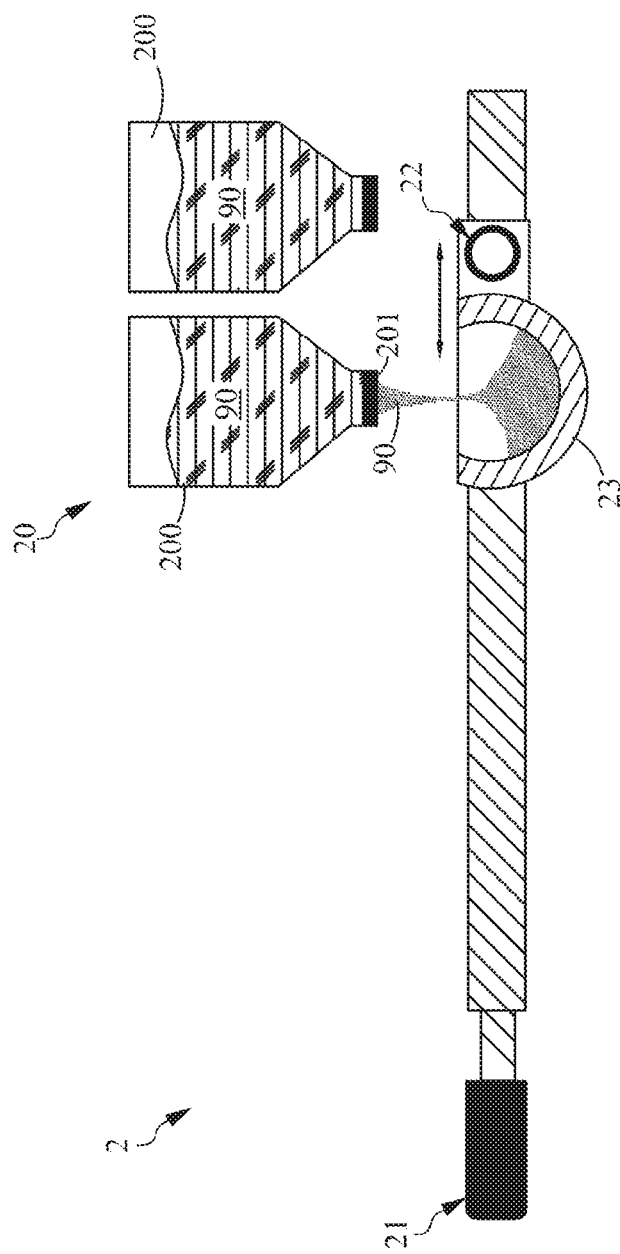
FIG. 1 is a schematic diagram showing a powder distribution device according to an exemplary embodiment of the present disclosure.

Please refer to FIG. 1, which is a schematic diagram showing a powder distribution device according to an exemplary embodiment of the present disclosure. As shown in FIG. 1, the powder distribution device 2 comprises: a feeder 20, a translation driver 21, a rotation driver 22 and a receptacle 23, whereas the feeder 20 is used for providing at least one powder 90. In this exemplary embodiment, the feeder 20 is further configured with at least one container 200, while each container 200 is further formed with at least one feeding port 201. In a condition when there is only one such container 200 in the receptacle 20, the container 200 can be used for storing a single kind of powder or a mixture of different kinds of powders, and moreover, the powder can be formed with the same particle sizes or with different particle sizes. In the embodiment shown in FIG. 1, there are two containers 200 included in the receptacle 20, which are to be used for receiving two different kinds of powders in respective. Herein, the two different kinds of powders can be different from each other in material or in particle size. In addition, there are mechanisms built at positions corresponding to the feeding ports 201 for controlling the opening and close of the feeding ports 201, and since such open/close mechanisms are known to those skilled in the art and thus will not be described herein. It is noted that although there are only two containers 200 shown in the embodiment of FIG. 1, the amount of container 200 is not limited thereby, and thus can be determined according to actual requirement.

Figure 2A:
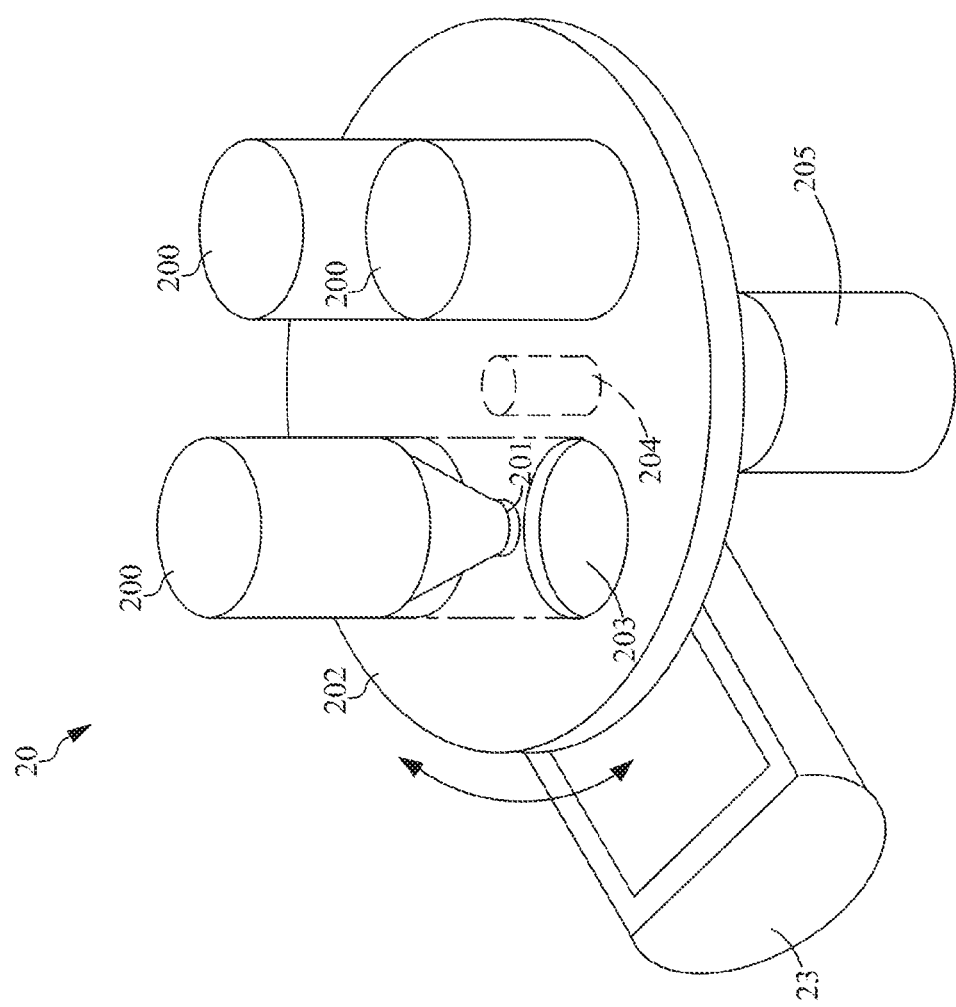
FIG. 2A is a schematic diagram showing an exemplary feeder designed for a powder distribution device of the present disclosure

Please refer to FIG. 2A, which is a schematic diagram showing an exemplary feeder designed for a powder distribution device of the present disclosure. In this embodiment, the containers 200 of the feeder 20 are mounted on a rotary table 202, whereas the rotary table is substantially a disc formed with a plurality of inset holes 203 for a plurality of containers 200 to be fitted therein. As shown in FIG. 2A, the rotary table 202 is configured with a shaft 204 to be used for coupling with a rotary element 205 so as to enable the rotary table 202 to be powered by the rotary element 205 and thus rotate accordingly. In this embodiment, there are four inset holes, and correspondingly there are four containers 200 to be fitted respectively in those four inset holes 203 respectively. However, it is not essential for each and every one of the inset hole 203 to be fitted by one container, only if there is at least one container 200 being mounted on the rotary table 202. In addition, the rotary element 205 can substantially be a driving device, such as a step motor or a servo motor, or can be an assembly of a motor and a transmission belt/chain, whichever is able to drive the rotary table 202 to rotate. As shown in FIG. 2A, the rotary table is designed for accommodating a plurality of such containers 200, and thereby, the feeder 20 as a whole is capable of providing various powders of different kinds or particle sizes to the receptacle 23 in a manner that while being driven to rotate by the rotary element 20, one container 200 having a specific powder stored therein can be selected from the plural containers 200 mounted on the rotary table 202 and thus is being rotate to a position corresponding to the receptacle 23, and thereafter, the feeding port 201 of the selected container 200 is opened for enabling the specific powder to be fed into the receptacle 23.

Figure 2B:
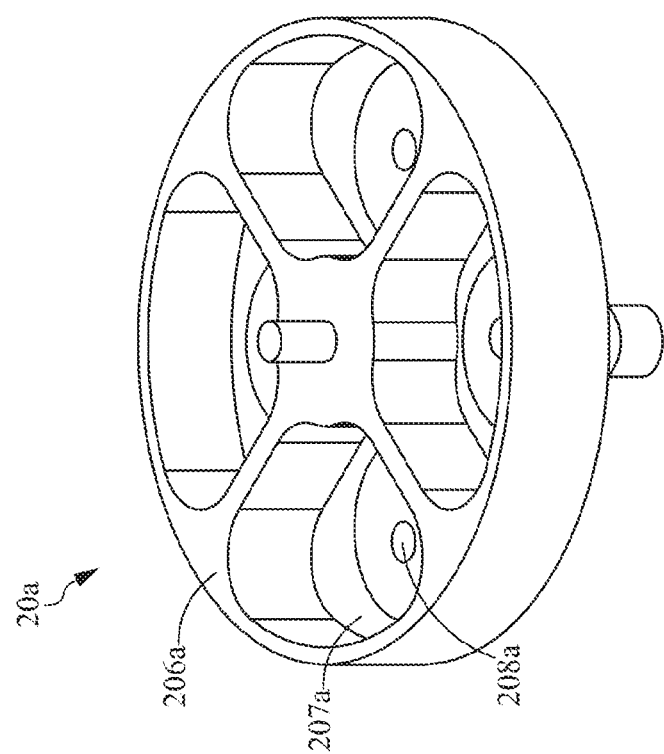
FIG. 2B and FIG. 2C are schematic diagrams showing respectively the structure of another exemplary feeder of the present disclosure and how the feeder is being assembled in a powder distribution device of the present disclosure.
Figure 2C:
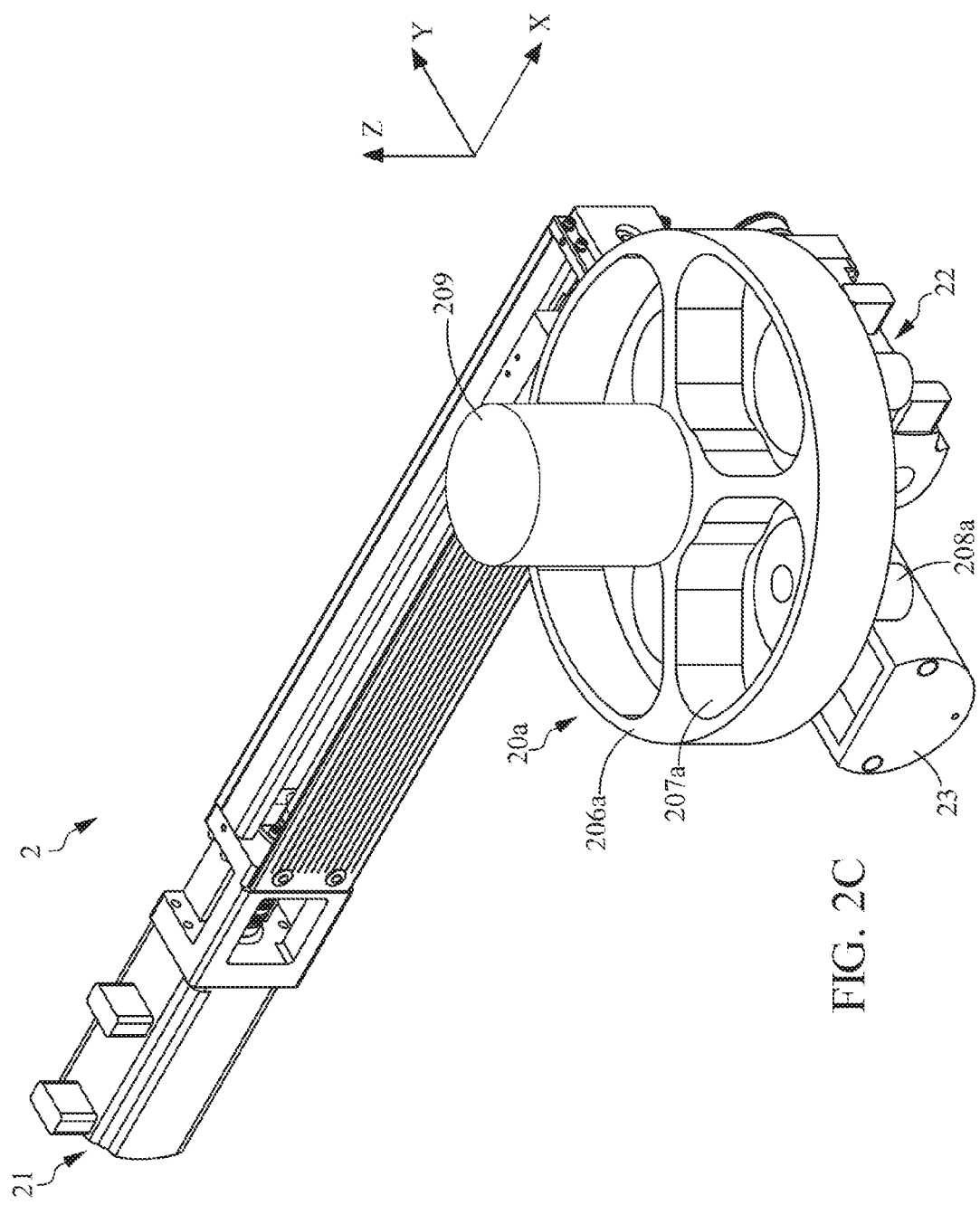

Please refer to FIG. 2B and FIG. 2C, which are schematic diagrams showing respectively the structure of another exemplary feeder of the present disclosure and how the feeder is being assembled in a powder distribution device of the present disclosure. In the embodiment shown in FIG. 2B and FIG. 2C, the feeder 20a further includes a frame 206a and a rotary element 209. It is noted that the cross section of the frame 206a can substantially be formed in a shape selected from the group consisting of: a circle, a polygon. In this embodiment, the frame 206a is substantially a column, which is formed with an internal space that is being divided into a plurality of accommodating slots 207a to be used for storing different kinds of powder, and each accommodating slot 207a is further formed with a feeding port 208a. As shown in FIG. 2B and FIG. 2C, the feeding port 208a of each accommodating slot 207a is formed on a side surface of the frame 206a that is corresponding to its accommodating slot 207a. In addition, The rotary element 209 is arranged coupling to the frame 206a, and in this embodiment, the rotary element 209 is used for powering and thus driving the frame 206a to rotate about a Z-axis that is defined in a Cartesian coordinate system in FIG. 2C. Similarly, the rotary element 209 can substantially be a driving device, such as a step motor or a servo motor, or can be an assembly of a motor and a transmission belt/chain, whichever is able to drive the frame 206a to rotate.

Figure 2D:
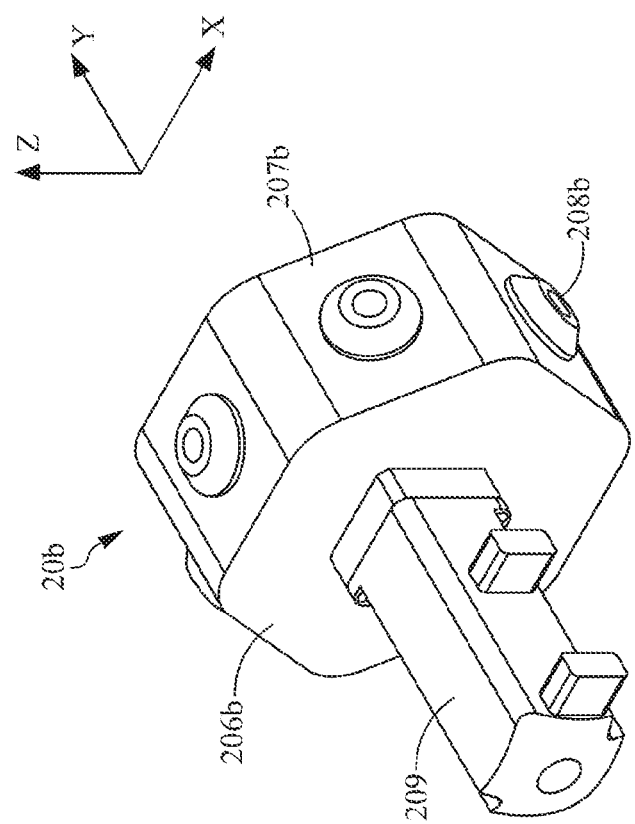
FIG. 2D is a schematic diagram showing further another exemplary feeder with a hexagon frame used in the present disclosure.

Please refer to FIG. 2D, which is a schematic diagram showing further another exemplary feeder with a hexagon frame used in the present disclosure. In this embodiment, the frame 206b of the feeder 20b, being a polygon-shaped column, is formed with a cross section of hexagon, and thereby, there can be six accommodating slots formed inside the hexagon-shaped column 206b. Moreover, as there are six side-surfaces 207b on the hexagon-shaped column 206b, there can be six feeding ports 208a formed respectively on the six side-surfaces 207b at positions corresponding to and communicating with the six accommodating slots in respective. Moreover, the frame 206b is coupled to the rotary element 209 by a side thereof for enabling the frame to be powered and thus driven to rotate by the rotary element 209. Similarly, there can be mechanisms built at positions corresponding to the feeding ports 208a in the embodiment shown in FIG. 2B and FIG. 2D, for controlling the opening and close of the feeding ports 208a, and since such open/close mechanisms are known to those skilled in the art and thus will not be described herein. Moreover, as shown in FIG. 2B and FIG. 2D, the frame is formed with a plurality of such containers accommodating slots, and thereby, the feeder as a whole, such as the feeders 20a and 20b, is capable of providing various powders of different kinds or particle sizes to the receptacle 23 in a manner that while the frame 206a, 206b is being controlled and driven to rotate about a Y-axis by the rotary element 209, one accommodating slot having a specific powder stored therein can be selected from the plural accommodating slot formed on the frame 206a, 206b and thus is being rotate to a position corresponding to the receptacle 23, and thereafter, the feeding port 208a, 208b of the selected accommodating slot is opened for enabling the specific powder to be fed into the receptacle 23.

Figure 3:
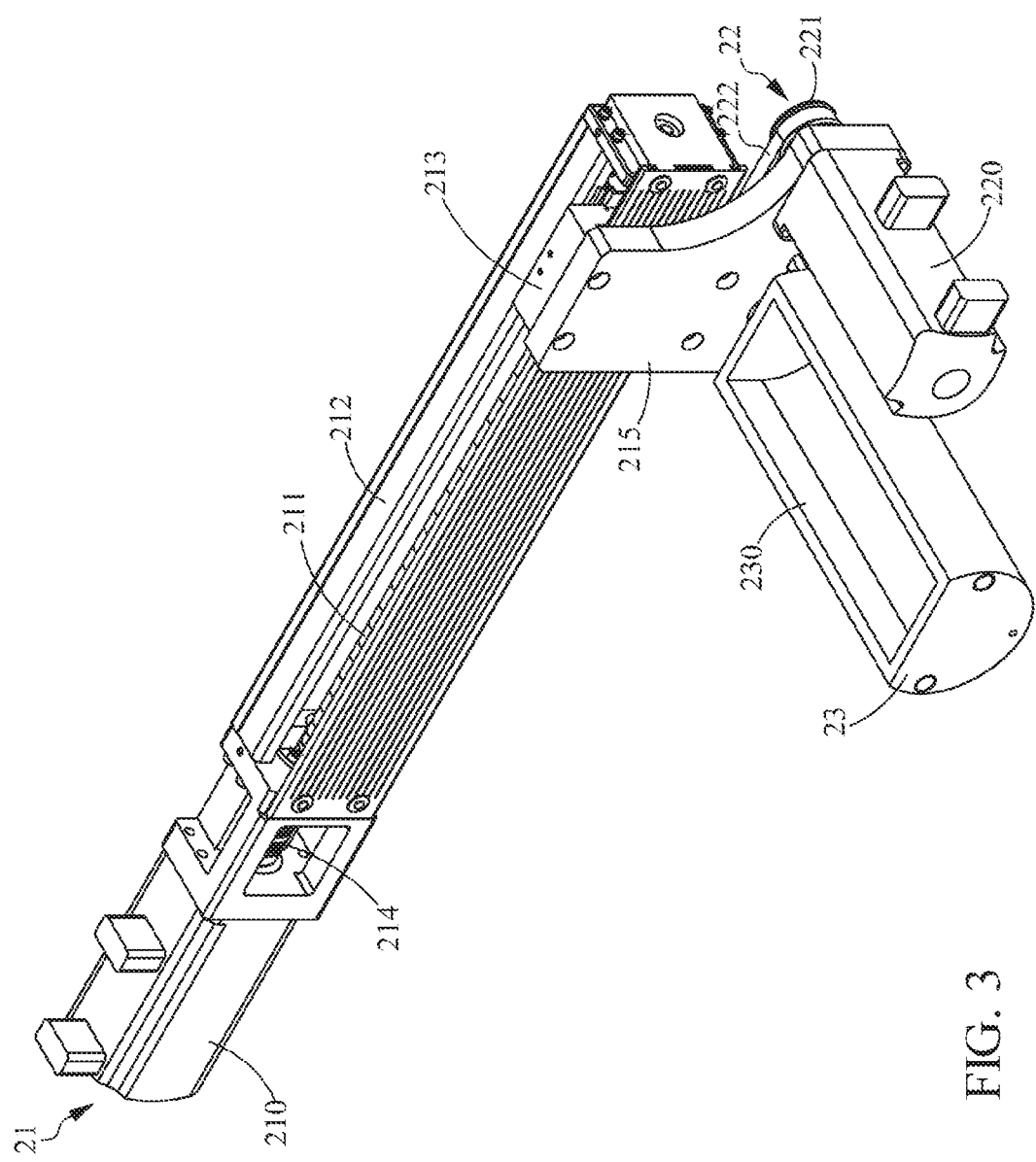
FIG. 3 is a three-dimensional diagram showing the assembly of a translation driver and a rotation driver in the present disclosure.

It is noted that the translation drive 21, as the one shown in FIG. 1, is used for providing a translational driving force. Please refer to FIG. 3, which is a three-dimensional diagram showing the assembly of a translation driver and a rotation driver in the present disclosure. In FIG. 3, the translation driver 21 is configured with a motor 210, a screw rod 211, a slide seat 212 and a slide block 213, in a manner that the motor 210 is coupled to the screw rod 211 by a coupling 214 for enabling the screw rod 211 to be powered and driven to rotate by the motor 210, and the slide block 213 is slidably mounted on the slide seat 212 while screwed to the screw rod 211 so that the slide block 213 is enabled to slide on the slide seat 212 by the screw rod 211 that is being driven to rotate by the motor 210. It is noted that the translation driver is provided solely for driving the receptacle 23 to move, and thus in addition to the one disclosed in FIG. 3, it can be achieved in another manner known to those skilled in the art, so that the translation driver is not limited by the embodiment shown in FIG. 3.

Figure 4:
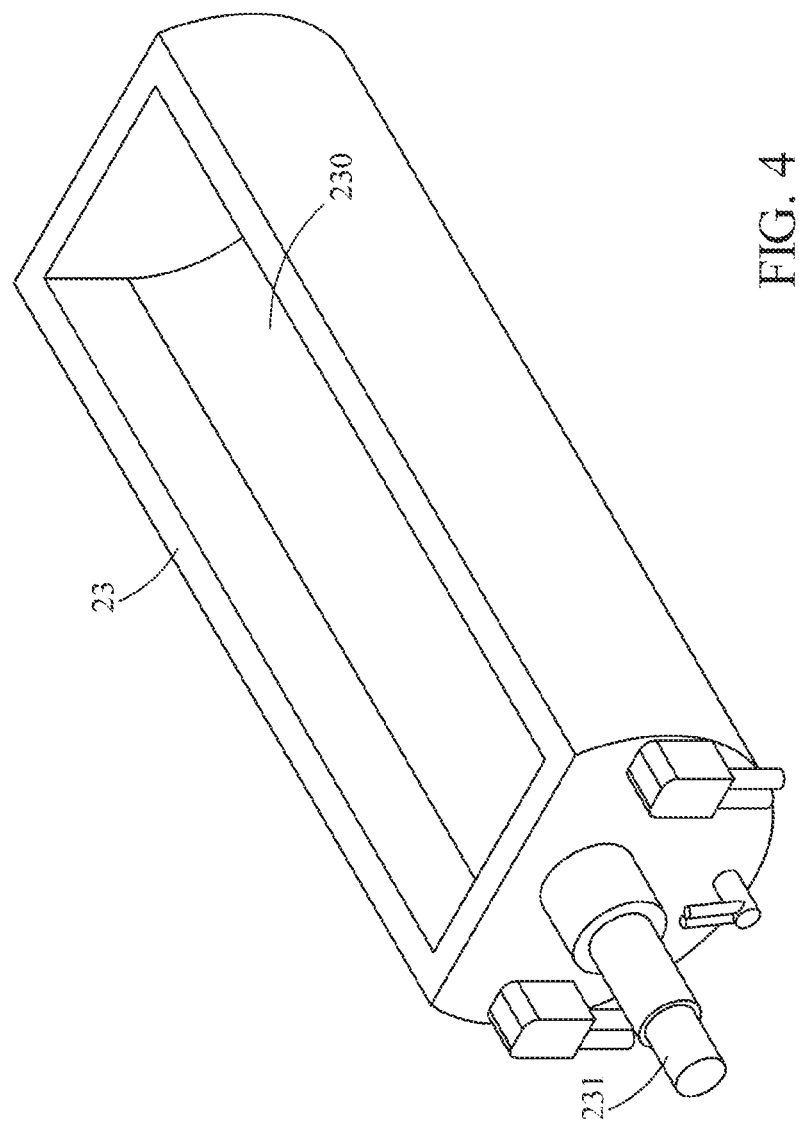
FIG. 4 and FIG. 5 are schematic diagrams showing respectively two exemplary receptacles used in the present disclosure.
Figure 5:
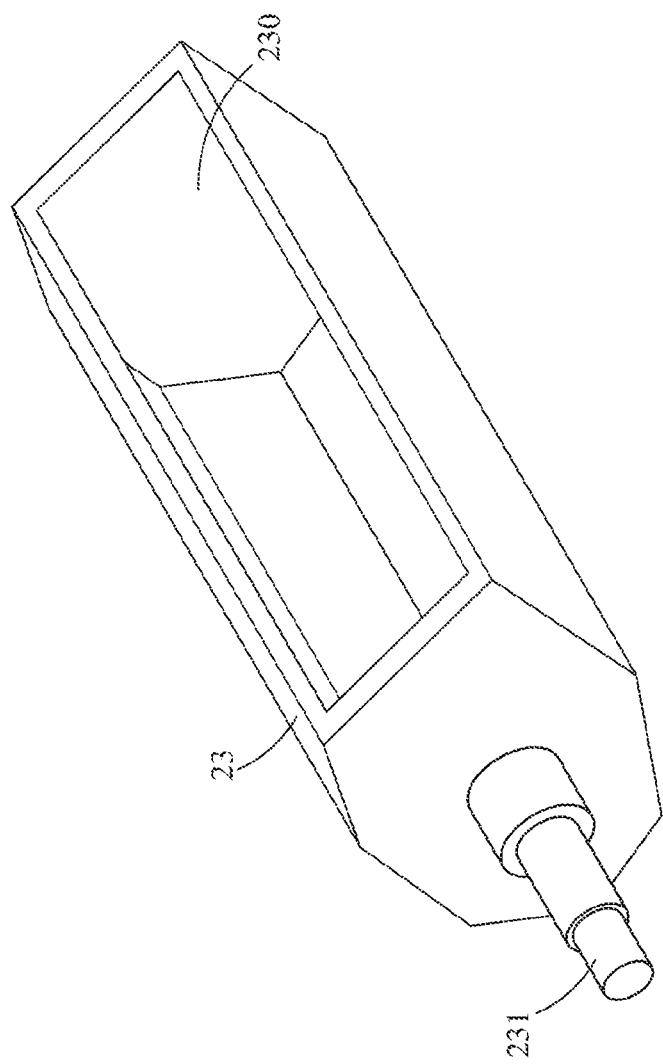

In the embodiments shown in FIG. 1 and FIG. 3, the rotation driver 22 is coupled to the translation driver 21. Taking the embodiment shown in FIG. 3 for example, the rotation driver 22 is coupled to the slide block 213 for enabling the rotation driver 22 to receive the translational driving force from the translation driver 21 and thus to be brought along to move in a linear translation movement by the translational driving force. Moreover, in this embodiment of FIG. 3, the slide block 213 is coupled with the rotation driver 22 through a connecting plate 215. However, the connecting plate 215 is just for achieving the connection between the slide block 213 and the rotation driver 22, and thus it is not an essential component for the present disclosure. The rotation driver 22, being a device for providing a rotational driving force to the receptacle 23 so as to brought along the receptacle 23 to rotate, is configured with a motor 220, a pair of pulleys 221 and a belt 222 in a manner that the two pulleys 221 are coupled respectively to the motor 220 and the rotation axis of the receptacle 23 while enabling the belt 222 to be coupled to the pair of the pulleys. It is noted that the motor 220 can be a step motor or a servo motor. As shown in FIG. 3. the receptacle 23 is coupled to the rotation driver 22 for enabling the receptacle 23 to receive the rotational driving force from the rotation driver 22 so as to be driven to perform a rotation movement while being brought along to move with the rotation driver 22 in a linear translation movement by the translational driving force of the translation driver 21. In the embodiment shown in FIG. 3 and FIG. 4, the receptacle 23, being provided for storing the at least one powder, is substantially a container having an opening 230 formed on top thereof to be used as a powder inlet or outlet. In addition, the receptacle 23 further has a rotation shaft 231 that is arranged coupling with the rotation driver 22 for enabling the receptacle 23 to be driven to rotate by the rotation driver 22, and thereby, enabling the rotation angle of the receptacle 23 to be controlled by the rotation driver 22 through a controller controlling the rotation driver 22. Moreover, the receptacle 23 can be a cylinder-like structure, such as the circular-shaped cylinder shown in FIG. 4, or the polygon-shaped cylinder shown in FIG. 5.

Figure 6:
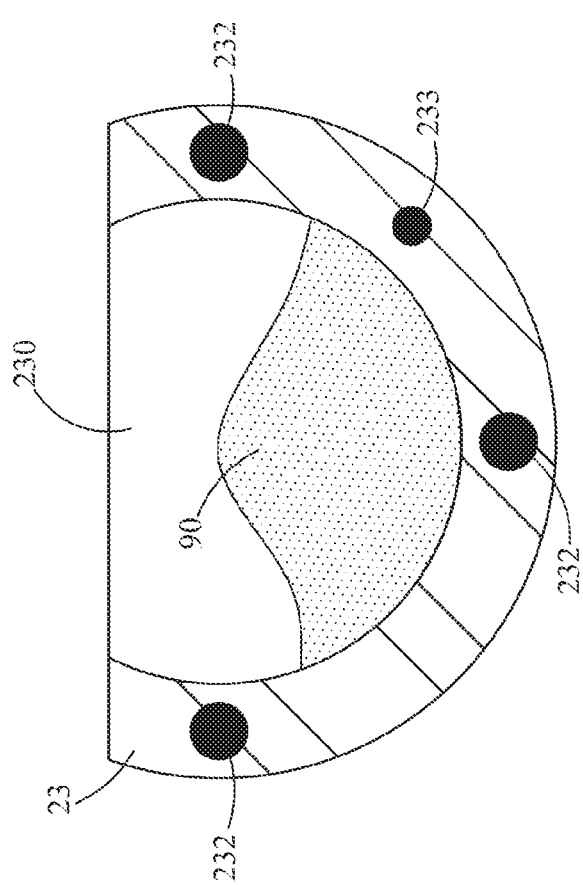
FIG. 6 is a cross sectional view of another exemplary receptacle used in the present disclosure.

Please refer to FIG. 6, which is a cross sectional view of an exemplary receptacle used in the present disclosure. In this embodiment, the receptacle 23 is structured similar to those disclosed in FIG. 4 or FIG. 5, but is additional being configured with at least one heating element 232 and a temperature sensor 233, in which each heating element 232 is used for preheating the at least one powder 90 stored inside the receptacle 23; and the temperature sensor 233 is disposed inside the receptacle 23 for measuring temperature of the at least one powder 90 as the powder is being heated the heating element 232 while transmitting the result of the temperature measurement to a controller to be used as a reference for determining whether to activate or deactivate the heating element 232, or to adjust the heating power of the heating element 232. Operationally, during the powder 90 is being preheated by the heating element 232, the receptacle 23 is enabled to rotate reciprocatingly for allowing power 90 stored therein to be heated fully and mixed uniformly.

Figure 7:
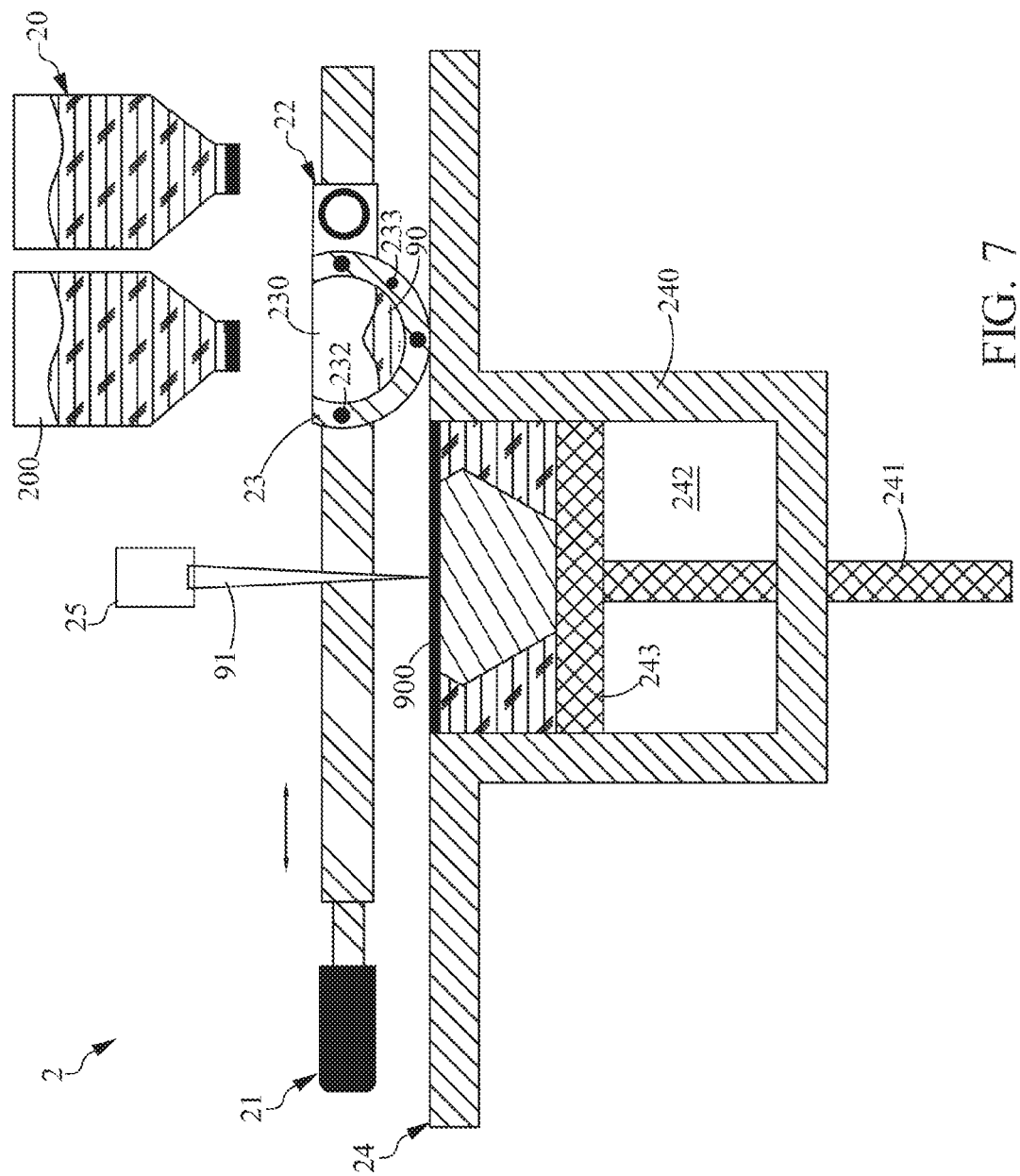
FIG. 7 is a schematic diagram showing a powder distribution device according to further another exemplary embodiment of the present disclosure.

Please refer to FIG. 7, which is a schematic diagram showing a powder distribution device according to further another exemplary embodiment of the present disclosure. In addition to the structures and components shown in FIG. 1, the powder distribution device in this embodiment of FIG. 7 is further consisted of: a processing unit 24 and a light source 25. The processing unit 24 includes: a base 240, formed with a recess 242; and a lifting element 241, having a platform 243 slidably fitted in the recess 242 for enabling the platform 243 to be driven to slide inside the recess 242 by a lifting force from the lifting element 241, in which the platform 243 is used as a powder bed for supporting the power that is being distributed into a layer 900. In addition, the light source 25 is provided for projecting and focusing a processing light onto the layer of powder 900 that is deposited on the platform 243. In this embodiment, the light source 25 is a laser source capable of emitting a laser beam onto the layer of powder for an additive manufacturing operation, such as a selective laser sintering or a selective laser melting.

Figure 8A:
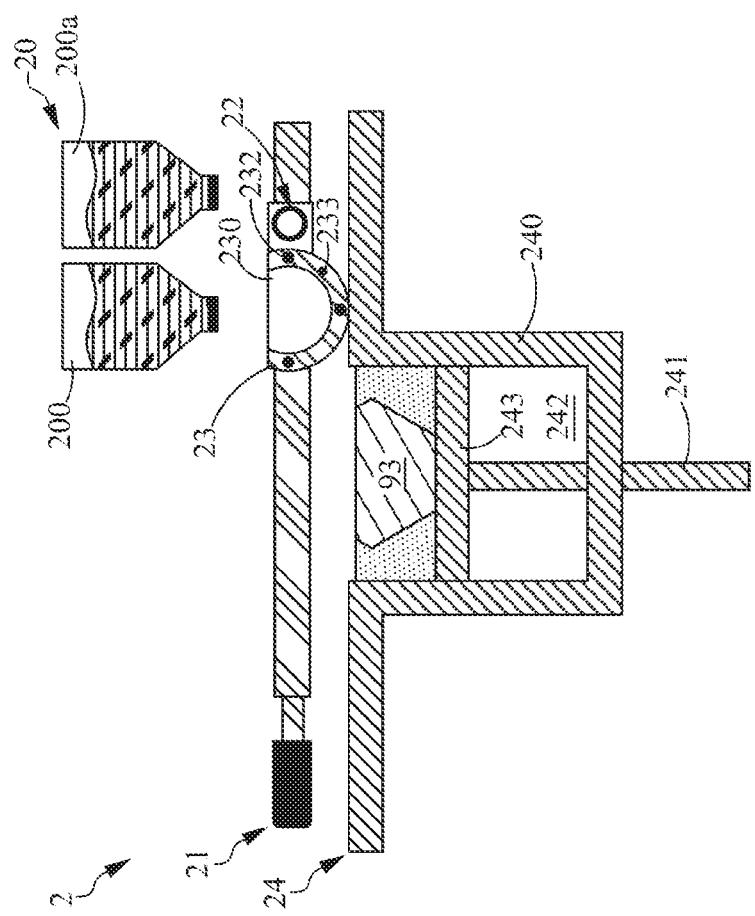

Please refer to FIG. 8A to FIG. 8J are schematic diagrams showing respectively steps performed in a powder distribution method according to an exemplary embodiment of the present disclosure. The powder distribution method, which is adapted for a powder distribution device 2, such as those disclosed in FIG. 1 to FIG. 7, starts from the step show in FIG. 8A. At the step of FIG. 8A, a translation driver 21 is enabled for driving a receptacle 23 to move to a first position, whereas the first position is a location corresponding a feeder 20 for allowing the receptacle 23 to receive powders that are discharged from the feeder 20. Moreover, the area 93 shown in FIG. 8A is substantially a part in a powder bed that is formed from successive layers of powder after being treated by a plurality of optical fabrication processes, and consequently the steps shown in FIG. 8B to FIG. 8J only represent a procedure for distributing at least one powder into a new layer on top of the powder bed, which can be any one layer of the successive layers of powder in the powder bed. After the step of FIG. 8A, the step shown in FIG. 8B is being executed. At the step of FIG. 8B, a feeder 20 is enabled to provide at least one powder 90 to the receptacle 23 at the first position. Under a condition when it is only require one kind of powder for forming this new powder layer on the powder bed, the filling of powder into the receptacle is completed after the step shown of FIG. 8B is completed. However, if the new layer of powder is formed by the use of more than two powders in different particle sizes or kinds, the step shown in FIG. 8C will be executed after the step of FIG. 8B. At step of FIG. 8C, the receptacle 23 is being driven to move to another first position corresponding to another feeder 200a for allowing the feeder 200a to feed a different powder into the receptacle 23. Nevertheless, the abovementioned step of FIG. 8C is applicable only to the powder distribution device of FIG. 1. On the other hand, for those devices structured as those disclosed in FIG. 2A, FIG. 2B and FIG. 2D, the receptacle 23 is not required to move to another first position, but instead, after the receptacle 23 is fed by the powder discharged from one accommodating slot of the feeder, the feeder is enabled to rotate by the rotary element for enabling another accommodating slot to be positioned corresponding to the receptacle 23 for allowing another kind of powder that is stored in this accommodating slot to be fed into the receptacle 23.

Figure 8E:
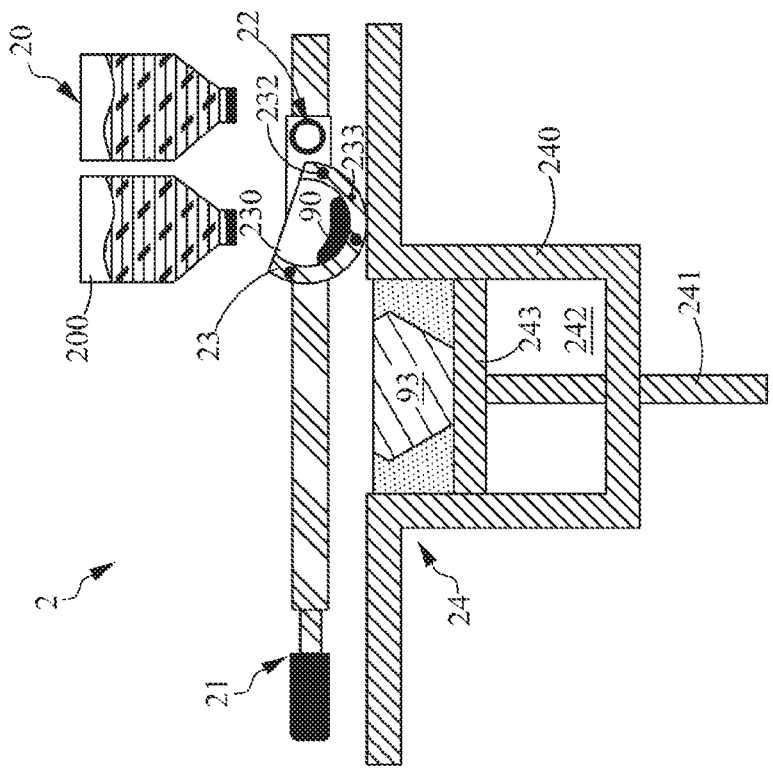
Figure 8D:
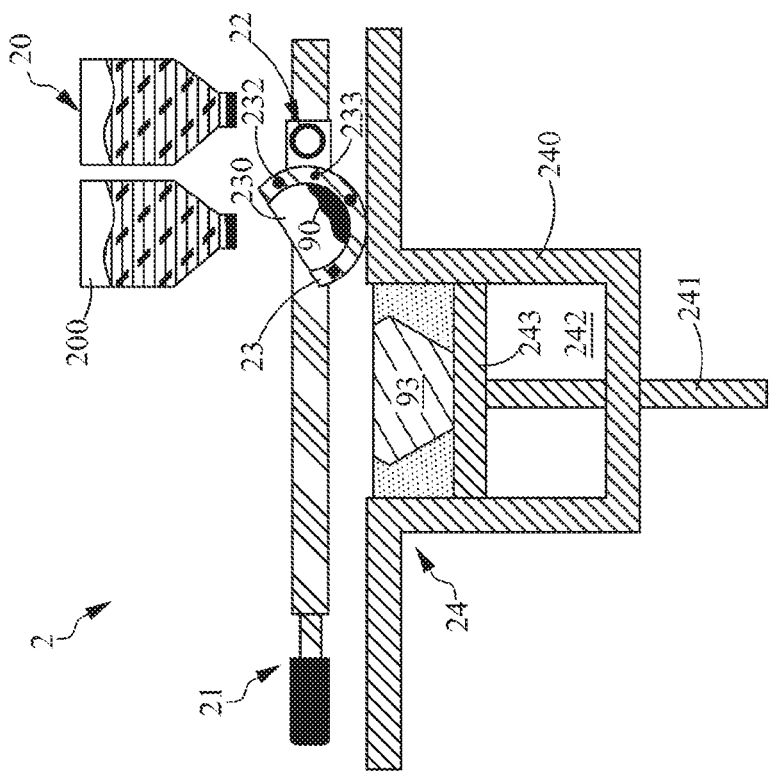

After all the required powders are being fed into the receptacle 23, the steps of FIG. 8D and FIG. 8E are executed. At the steps shown in FIG. 8D and FIG. 8E, the receptacle 23 is being driven to rotate within a specific range of angle by the rotary driver 22 so as to enable powders received in the receptacle 23 to mixed fully and uniformly. In addition, if the receptacle 23 is being heated by a heating element 232, the rotation of the receptacle 23 is able to enable the powders received in the receptacle 23 to be heated evenly, as indicated in another embodiment described above.

Figure 8F:
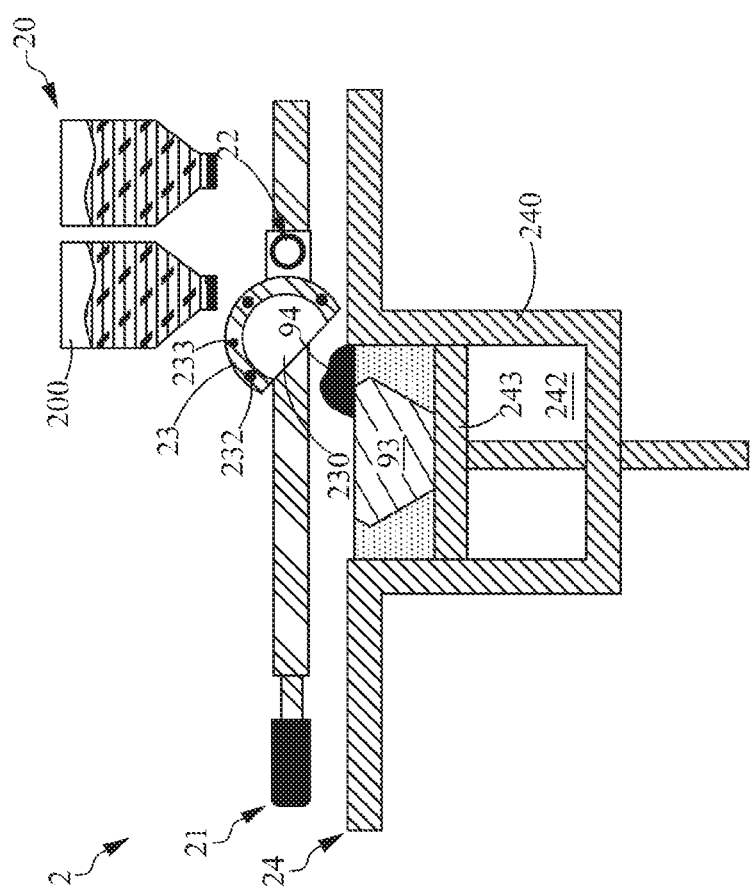
Figure 9:
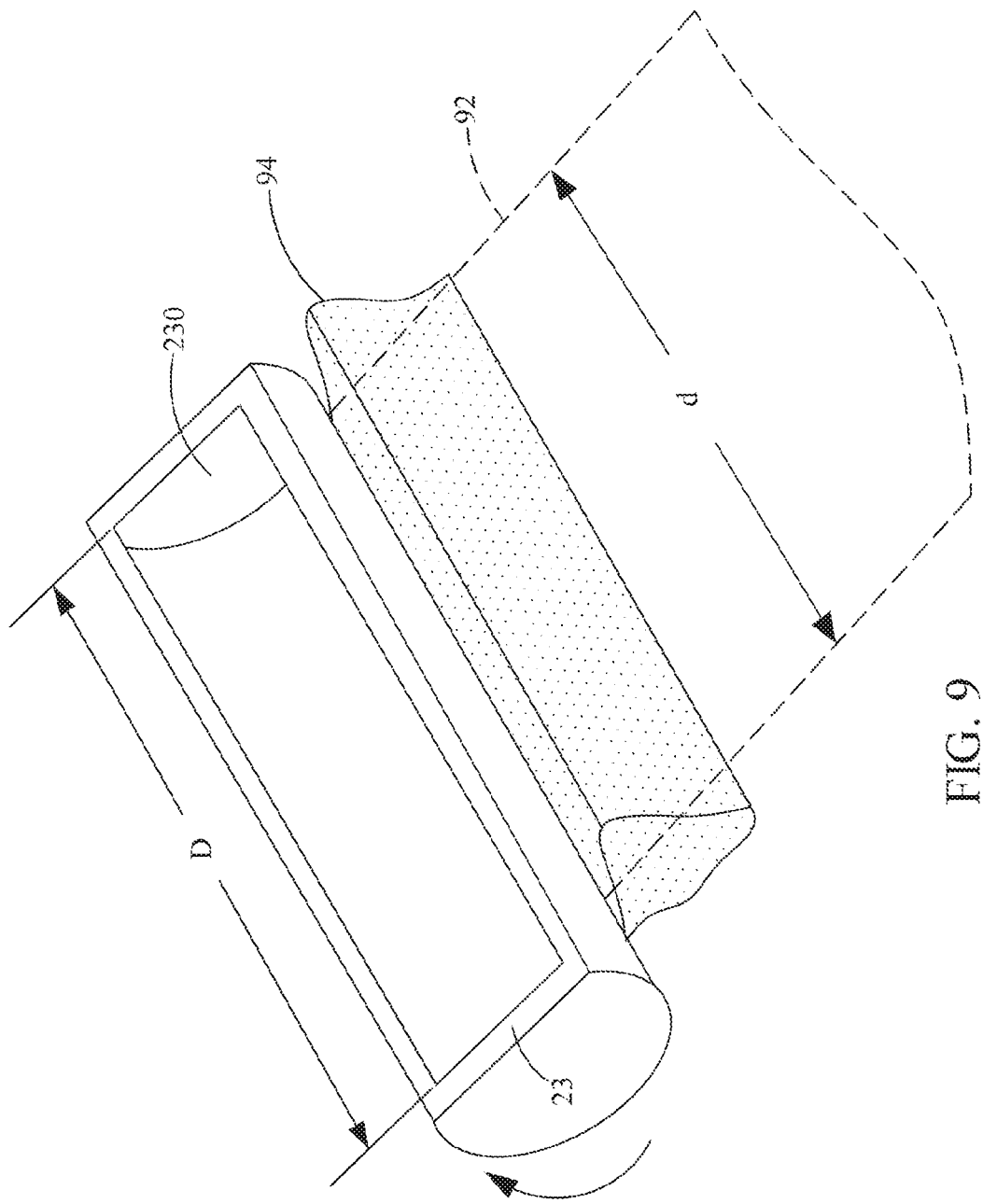
FIG. 9 is a schematic diagram depicting the relation between the width of an opening formed on a receptacle and the area where the powder can be distributed in the present disclosure.

However, if there is only one kind of powder being received in the receptacle 23 and the single kind of powder had already been preheated, or if the receptacle 23 has more than two kinds of powders stored therein while those different powders had already been mixed fully and preheated before being fed into the receptacle 23, the steps of FIG. 8D and FIG. 8E can be omitted from the powder distribution method. Thereafter, the step shown in FIG. 8F is executed. At the step shown in FIG. 8F, the translation driver 21 is activated for driving the receptacle 23 to move to a second position, and thus the rotation driver 22 is activated for driving the receptacle 23 to rotate for enabling the powder 90 received in the receptacle 23 to be poured out from the same and deposited on the second position into a pile of powder 94. For ensuring the pile of powder 94 to be distributed evenly into a layer on a working area 92, the opening 230 of the receptacle 23 should be formed in a width D larger than the width d of the working area 92 so as to ensuring the pile of powder 94 to be distributed in an area with a width larger than the width d of the working area 92, as shown in FIG. 9.

Figure 8G:
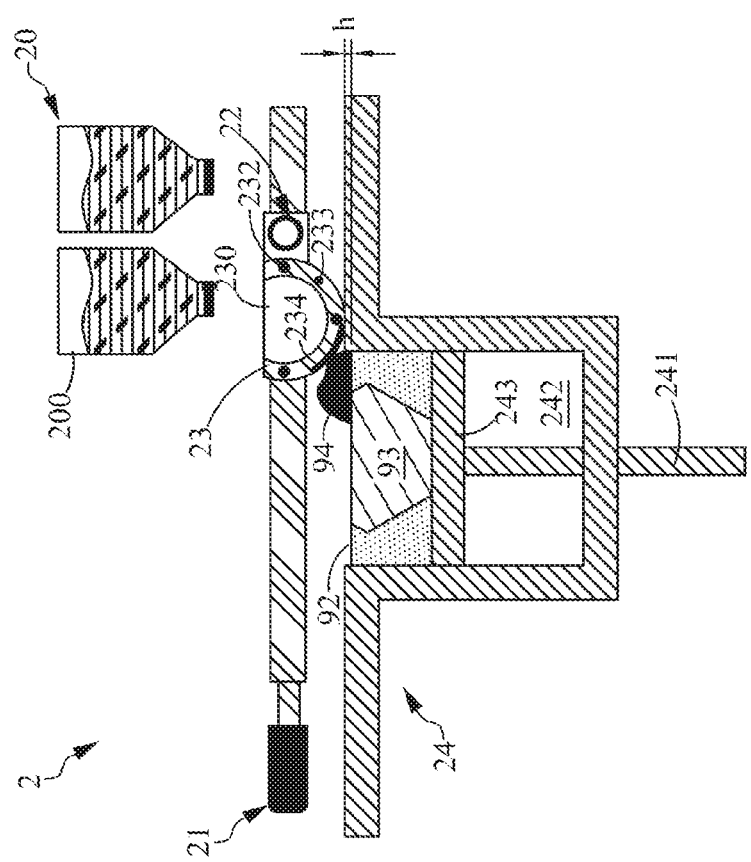
Figure 8I:
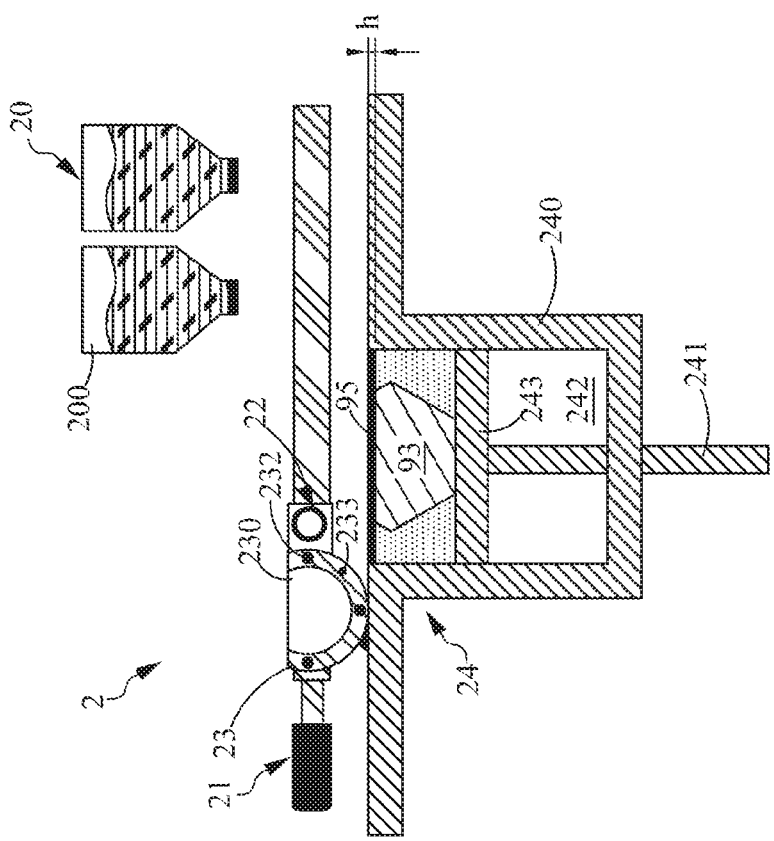
Figure 8H:
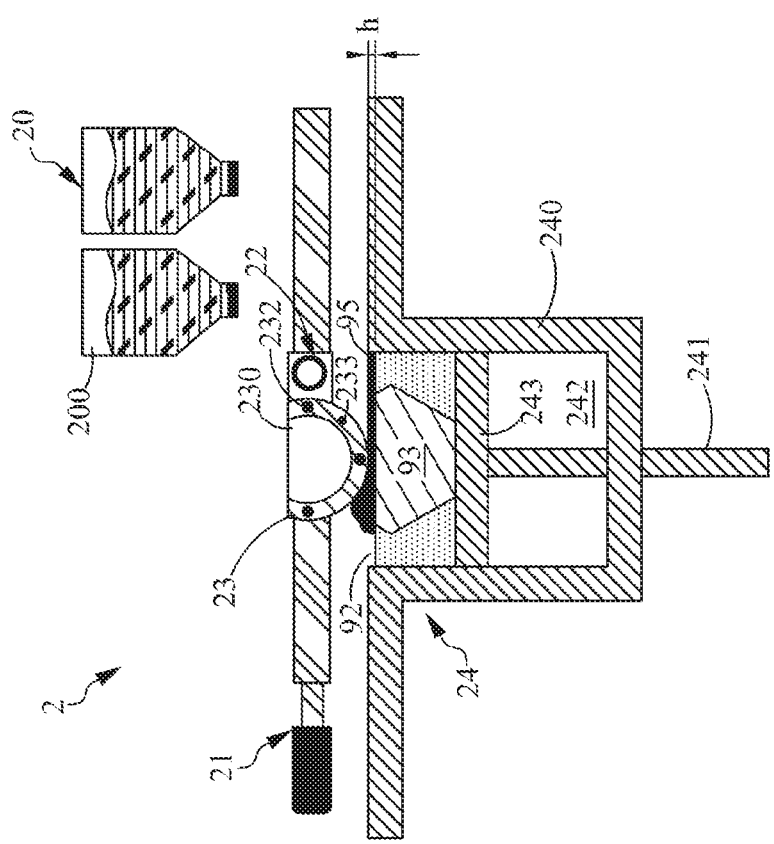
Figure 8J:
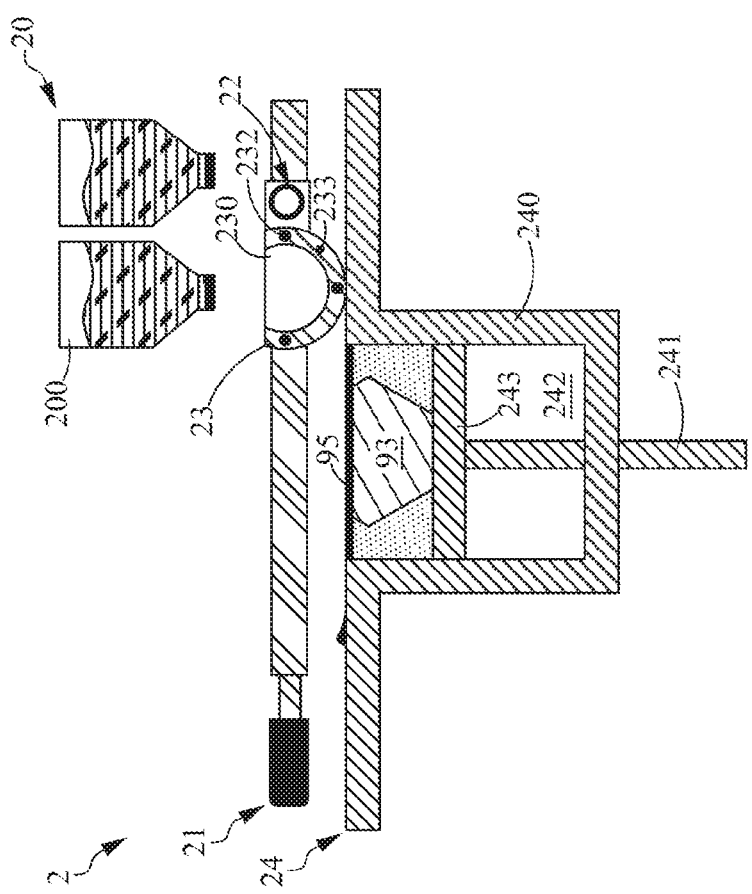

After the step of FIG. 8F is completed, the step shown in FIG. 8G is executed. At the step of FIG. 8G, the receptacle 23 is being driven to rotate by the rotation driver 22 to a specific condition that the receptacle 23 is positioned for allowing a portion 234 of the outer shell of the receptacle 23 to engage with the pile of powder 94 while the receptacle 23 is being brought along to move in the linear translation movement. It is noted that the portion 234 of the outer shell of the receptacle 23 can be a curved surface or a flat surface. After the step of FIG. 8G is completed, the steps shown in FIG. 8H and FIG. 8I is executed. At the steps of FIG. 8H and FIG. 8I, the receptacle 23 is being driven to move by the translation driver 21 for moving the receptacle 23 across the pile of powder 94 and thus distributing the pile of powder 94 into a layer on the working area 92. In this embodiment, the working area is the area corresponding to the recess 242 of the base 240. It is noted that before executing the steps shown in FIG. 8H and FIG. 8I, the lowest point at the portion 234 of the outer shell that is to be engaged with the pile of powder is spaced from the working area by a gap h, so that when the receptacle 23 is being driven to move in the linear translation movement across the pile of powder 94, the pile of powder will be pushed to move by the outer shell of the receptacle 23 so as to be spread over and pressed tightly in the space sandwiched between the bottom of the receptacle 23 and the working area 92 into a layer of powder. It is noted that the gap h is adjustable by the lifting and lowering of the lifting element 241. After the steps of FIG. 8H and FIG. 8I is completed, the step shown in FIG. 8J is executed. At the step of FIG. 8J, after a new layer of powder 95 being formed at the working area 92 on top of the original powder bed, the receptacle 23 is being driven to move again to the first position by the translation driver 21 to be prepared for another powder distribution.

Figure 8K:
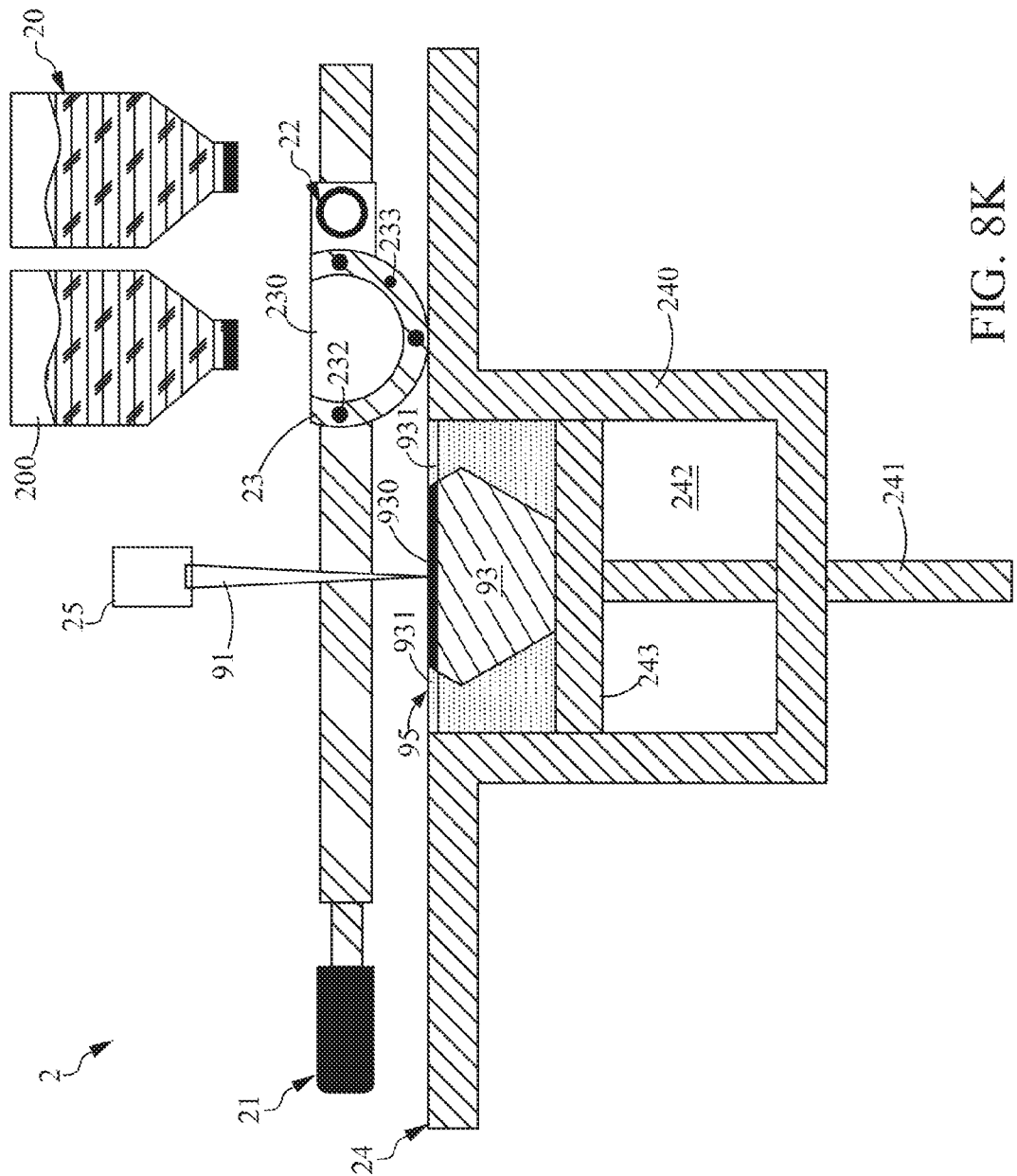
FIG. 8K is a schematic diagram showing how a light source is adapted for focusing a processing light emitted therefrom onto a layer on powder distributed on the working area for the proceeding of an optical fabrication process in the present disclosure.

Furthermore, in another embodiment of the present disclosure, in addition to the abovementioned steps of FIG. 8A to FIG. 8J, the powder distribution method further comprises a step as shown in FIG. 8K. At the step of FIG. 8K, a light source 25 is provided for projecting and focusing a processing light 91 upon the layer of powder 95 for performing an optical fabrication process thereon. In this embodiment, the light source 25 can be a laser device, which is capable of emitting a laser beam to be used as the processing light 91. As shown in FIG. 8K, the processing light 91 can be directed and thus selectively projected upon a specific position on the working area 92 for sintering or melting the powder layer 95 to the exact geometry defined by a 3D digital description of a part 93, and thereby, after being scanned by the processing light 91, the powder in the area 930 of the powder layer 95 that is being scanned by the processing light 91 is fused into a cross section of the part while allowing the other area 931 that is not scanned to remain physically and chemically unchanged. By repeating the forgoing steps of FIG. 8A to FIG. 8K, the part 93 can be constructed gradually from the successive layers of powder in a layer-by-layer manner. Nevertheless, in this embodiment, the powder being used for forming each and every powder layer 95 in each repeating of the steps of FIG. 8A to FIG. 8K for constructing the part 93 is always the same kind of powder, or a mixed powder of the same ingredients, so that the final part 93 is a mass made from the same material.

However, in another embodiment of the present disclosure, each layer in the successive layers of powder can be made of powders of different ingredients, that is, the powders for different layers in the successive layers of powder can be different from each other in kinds or in particle sizes. Operationally, after completing the step of FIG. 8K and before the process begins another repeating of the steps of FIG. 8A to FIG. 8C, the powder that is stored inside the receptacle is changed and replaced by another kind of powder. For instance, if the powder used in a current repeating of the steps of FIG. 8A to FIG. 8K is a powder A, or a mixed powder of powder A and powder B, another powder that is different from the powder A or the mixed powder of powder A and powder B will be used in the next repeating of the steps of FIG. 8A to FIG. 8K, such as a powder C, or a mixed powder of powder C and powder D. Similarly, if the powder used in a current repeating of the steps of FIG. 8A to FIG. 8K is a powder of particle size A, another powder in different particle size that is different from the powder of particle size A will be used in the next repeating of the steps of FIG. 8A to FIG. 8K, such as a powder of particle size B. Thereby, the final part 93 being fabricated is a mass formed from successive layers of different materials. It is noted that the aforesaid powder distribution method of additive manufacturing can be applied for producing multi-layered piezoelectric actuators, or for producing diffusion films. Especially for the multi-layered piezoelectric actuator that is generally a laminated structure composed of successive layers of different materials, such as a three-layered structure of a layer of ceramic, a layer of conductive material layer and a layer of insulation material, the laminated structure of the multi-layered piezoelectric actuator, that is formed from successive layers of different materials, can be achieved by the use of the aforesaid embodiments without the complexity of those conventional processes for producing the same multi-layered piezoelectric actuators.

Figure 10:
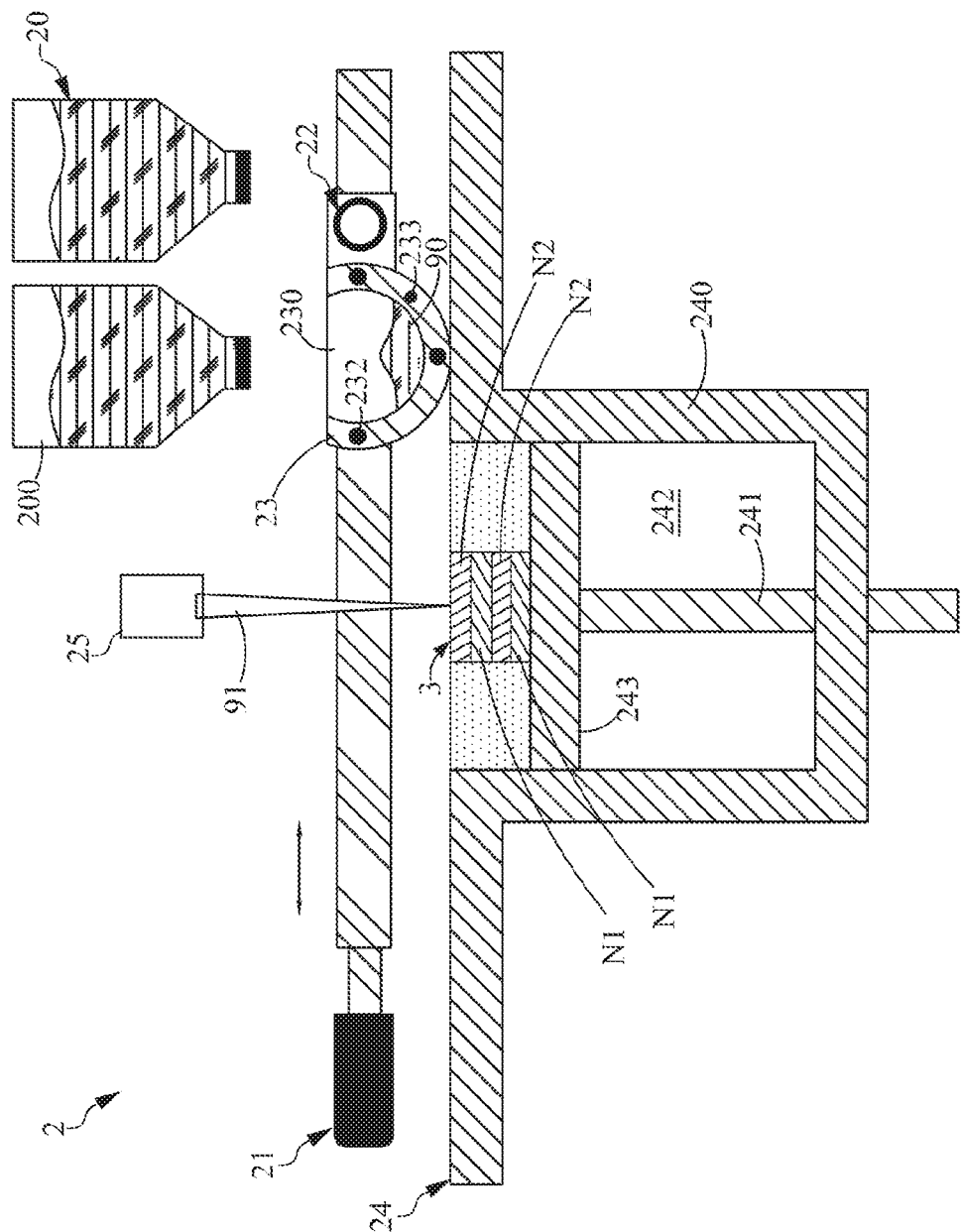
FIG. 10 is a schematic diagram showing a part formed from successive layers of different materials by the use of a device and method for powder distribution of additive manufacturing according to the present disclosure.

On the other hand, regarding to the production of diffusion films, the aforesaid powder distribution method of additive manufacturing is also favored, since the diffusion film today, that is generally being used for enabling light from a light guide plate to be evenly distributed so as to eliminate a mura effect, is usually constructed as a multi-layer film composed of successive layers of different materials. Please refer to FIG. 10, which is a schematic diagram showing a part formed from successive layers of different materials by the use of a device and method for powder distribution of additive manufacturing according to the present disclosure. For a diffusion film that is composed of a plural layers of a N1 material while allowing a layer of a N2 material to be sandwiched between any two neighboring layers of N1 material, such as the four-layered diffusion film that is configure with two layers of N1 material and two layers of a N2 material in a alternating manner, as shown in FIG. 10, the four-layered diffusion film can easily be achieved after four repeatings of the steps shown in FIG. 8A to FIG. 8K.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A powder distribution device, comprising:
    a feeder configured with at least one container, for providing at least one powder;
    a translation driver, for providing a translational driving force;
    a rotation driver, for providing a rotational driving force while being coupled to the translation driver; and
    a receptacle, coupled to the rotation driver for enabling the receptacle to receive the rotational driving force from the rotation driver so as to be driven to perform a rotation movement while being brought along to move with the rotation driver in a linear translation movement by the translational driving force, and the receptacle being provided for receiving the at least one powder therein for allowing the at least one powder to be poured out of the receptacle by the rotation of the receptacle, and a receptacle controller configured to control the receptacle, wherein the controller is configured to invert the receptacle to pour the at least one powder out through an opening in a top of the at least one container, and to rotate the receptacle back to contact an outer periphery of the receptacle with the poured-out powder and move the receptacle across the poured-out powder to spread the poured-out powder across a working area.

2. The powder distribution device of claim 1, wherein each container is further formed with at least one feeding port.

3. The powder distribution device of claim 1, wherein the feeder is further configured with a rotary table in a manner that said at least one container is disposed on the rotary table for selectively enabling one container selected from the at least one container to be rotated to a position corresponding to the receptacle.

4. The powder distribution device of claim 1, wherein the rotation driver is designed to receive the translational driving force so as to be driven to perform a linear translation movement.

5. The powder distribution device of claim 1, wherein the at least one powder that is being poured out of the receptacle is distributed into a layer by the linear translation movement of the receptacle.

6. The powder distribution device of claim 1, wherein the translation driver is configured with a motor, a screw rod, a slide seat and a slide block in a manner that the motor is coupled to the screw rod by a coupling for enabling the screw rod to be powered and driven to rotate by the motor, and the slide block is slidably mounted on the slide seat while coupling to the screw rod so that the slide block is enabled to slide on the slide seat by the screw rod that is being driven to rotate by the motor.

7. The powder distribution device of claim 6, wherein the slide block is coupled to the rotation driver via a connecting plate.

8. The powder distribution device of claim 1, wherein the rotation driver is configured with a motor, a pair of pulleys and a belt in a manner that the pair of pulleys are coupled respectively to the motor and a rotation axis of the receptacle while enabling the belt to be coupled to the pair of the pulleys.

* * * * *